US012802999B2

(12) United States Patent
Kim et al.

(10) Patent No.: US 12,802,999 B2
(45) Date of Patent: Nov. 17, 2026

(54) NEGATIVE ELECTRODE AND SECONDARY BATTERY INCLUDING THE SAME

(71) Applicant: LG ENERGY SOLUTION, LTD., Seoul (KR)

(72) Inventors: Ye Lin Kim, Daejeon (KR); Jung Woo Yoo, Daejeon (KR); Tae Gon Kim, Daejeon (KR); Young Jae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 747 days.

(21) Appl. No.: 17/605,334

(22) PCT Filed: Jun. 19, 2020

(86) PCT No.: PCT/KR2020/007986
§ 371 (c)(1),
(2) Date: Oct. 21, 2021

(87) PCT Pub. No.: WO2020/262890
PCT Pub. Date: Dec. 30, 2020

(65) Prior Publication Data
US 2022/0209240 A1 Jun. 30, 2022

(30) Foreign Application Priority Data
Jun. 28, 2019 (KR) ........................ 10-2019-0078182

(51) Int. Cl.
*H01M 4/134* (2010.01)
*H01M 4/38* (2006.01)
(Continued)

(52) U.S. Cl.
CPC ........... *H01M 4/625* (2013.01); *H01M 4/134* (2013.01); *H01M 4/386* (2013.01); *H01M 2004/021* (2013.01); *H01M 2004/027* (2013.01)

(58) Field of Classification Search
CPC ...... H01M 4/583; H01M 4/134; H01M 4/625; H01M 4/386; H01M 2004/024; H01M 2004/027
See application file for complete search history.

(56) References Cited

U.S. PATENT DOCUMENTS

2010/0193731 A1 8/2010 Lee et al.
2013/0295439 A1* 11/2013 Masarapu ............ H01M 4/485 429/188
(Continued)

FOREIGN PATENT DOCUMENTS

CN 105849946 A 8/2016
CN 106953069 A 7/2017
(Continued)

OTHER PUBLICATIONS

Machine Translation CN108511754A (Year: 2018).*
(Continued)

*Primary Examiner* — Osei K Amponsah
(74) *Attorney, Agent, or Firm* — Birch, Stewart, Kolasch & Birch, LLP

(57) ABSTRACT

Disclosed is a negative electrode which includes: a negative electrode current collector; and a negative electrode active material layer on the negative electrode current collector. The negative electrode active material layer includes a silicon-based negative electrode active material, a binder, a conductive material, and single-walled carbon nanotubes.
(Continued)

The single-walled carbon nanotubes are present in an amount of 0.001 wt % to 1 wt % in the negative electrode active material layer.

11 Claims, 3 Drawing Sheets

(51) Int. Cl.
*H01M 4/62* (2006.01)
*H01M 4/02* (2006.01)

(56) References Cited

U.S. PATENT DOCUMENTS

| | | | | |
|---|---|---|---|---|
| 2014/0070147 | A1 | 3/2014 | Lee et al. | |
| 2014/0287317 | A1* | 9/2014 | Tiquet | C04B 35/62897 427/113 |
| 2015/0010788 | A1 | 1/2015 | Aria et al. | |
| 2016/0365565 | A1 | 12/2016 | Park et al. | |
| 2016/0380270 | A1 | 12/2016 | Lee et al. | |
| 2017/0092939 | A1 | 3/2017 | Kim et al. | |
| 2019/0123352 | A1* | 4/2019 | Ko | H01M 10/052 |
| 2019/0123356 | A1 | 4/2019 | Ko et al. | |
| 2020/0058941 | A1 | 2/2020 | Hayashi et al. | |
| 2020/0328404 | A1 | 10/2020 | Aria et al. | |
| 2021/0249646 | A1* | 8/2021 | Inoue | H01M 50/46 |

FOREIGN PATENT DOCUMENTS

| | | | | |
|---|---|---|---|---|
| CN | 107946561 | A | 4/2018 | |
| CN | 108511754 | A * | 9/2018 | H01M 4/04 |
| JP | 2012-221672 | A | 11/2012 | |
| JP | 2015-53165 | A | 3/2015 | |
| KR | 10-2010-0088353 | A | 8/2010 | |
| KR | 10-2010-0138607 | A | 12/2010 | |
| KR | 10-2015-0077321 | A | 7/2015 | |
| KR | 10-2015-0121694 | A | 10/2015 | |
| KR | 10-2017-0074030 | A | 6/2017 | |
| KR | 10-1751787 | B1 | 6/2017 | |
| KR | 10-2019-0043955 | A | 4/2019 | |
| KR | 10-2019-0043957 | A | 4/2019 | |
| WO | WO 2015/003038 | A1 | 1/2015 | |
| WO | WO 2018/146865 | A1 | 8/2018 | |

OTHER PUBLICATIONS

Extended European Search Report for European Application No. 20830905.4, dated Apr. 25, 2022.

Park et al., "High areal capacity battery electrodes enabled by segregated nanotube networks", Nature Energy, vol. 4, Jul. 2019, pp. 560-567.

International Search Report for PCT/KR2020/007986 (PCT/ISA/210) mailed on Aug. 26, 2020.

* cited by examiner

[FIG. 1]
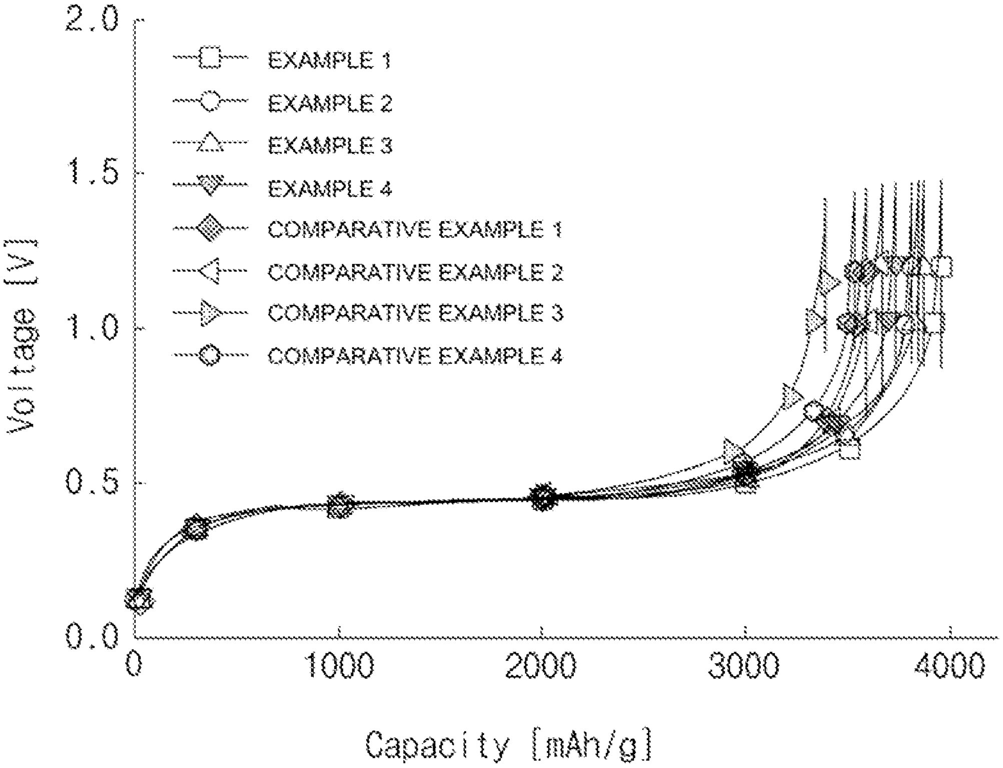

[FIG. 2]
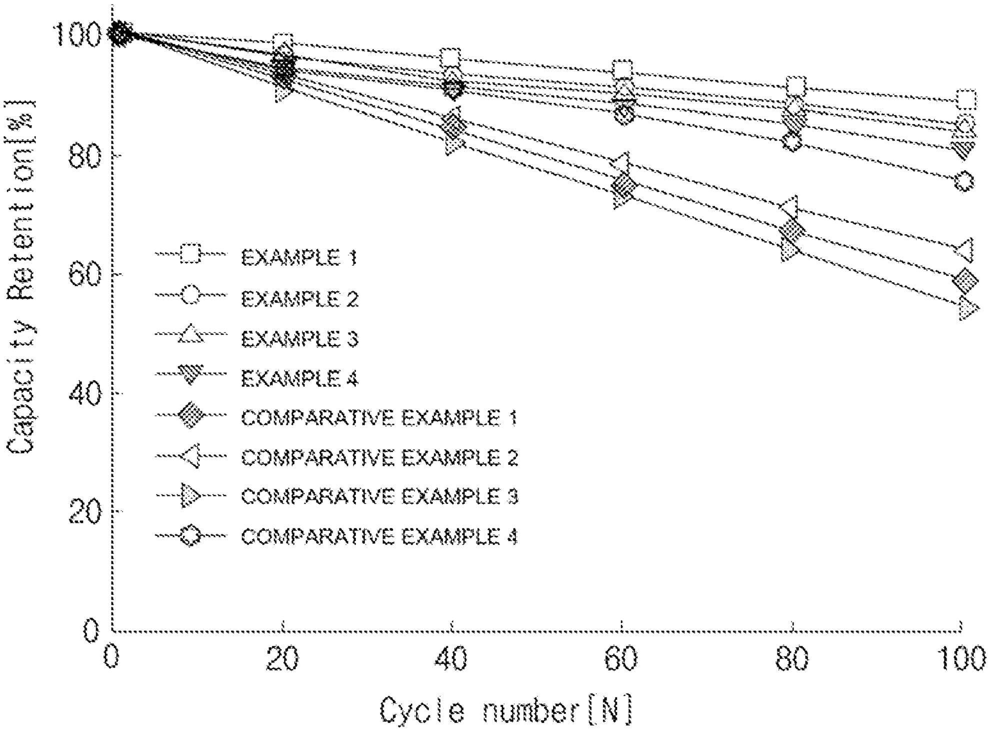

[FIG. 3]
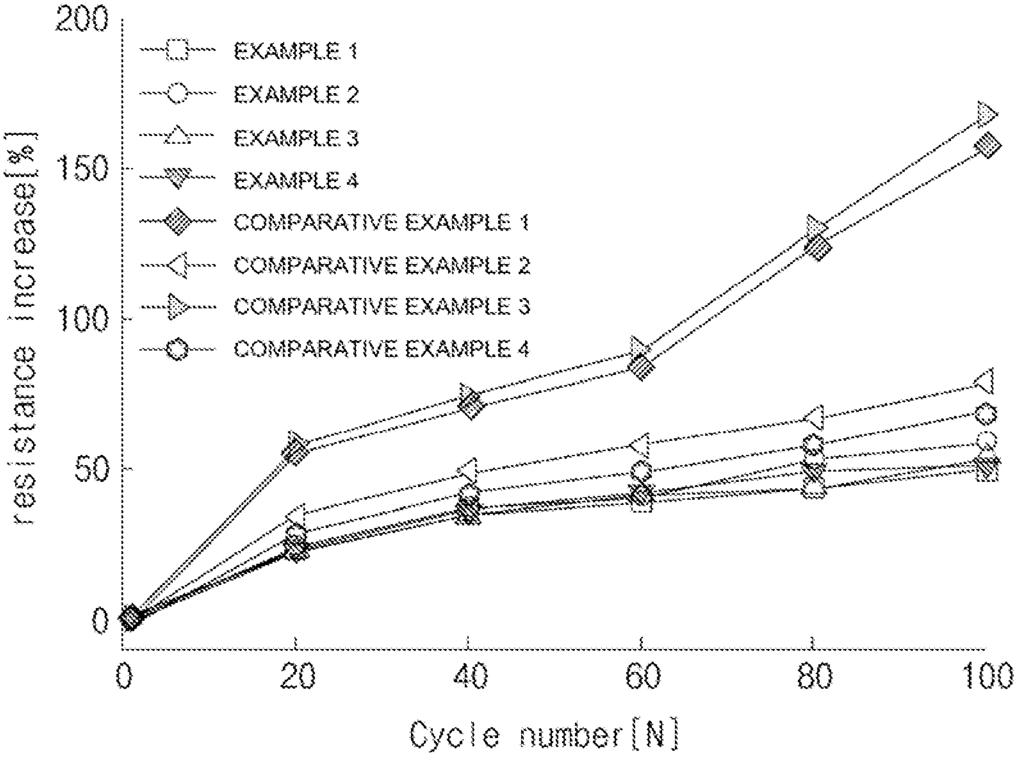

NEGATIVE ELECTRODE AND SECONDARY BATTERY INCLUDING THE SAME

TECHNICAL FIELD

Cross-Reference to Related Application

This application claims priority to and the benefit of Korean Patent Application No. 10-2019-0078182, filed on Jun. 28, 2019, the disclosure of which is incorporated herein by reference in its entirety.

TECHNICAL FIELD

The present invention relates to a negative electrode and a secondary battery including the same.

BACKGROUND ART

Recently, in response to the rapid spread of electronic devices using batteries, such as mobile phones, notebook computers, and electric vehicles, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for improving the performance of lithium secondary batteries have been continuously made.

The lithium secondary battery generally includes a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, lithium-containing metal oxides such as $LiCoO_2$, $LiMn_2O_4$, and the like are used as positive electrode active materials in the positive electrode, and carbon-based materials or silicon-based materials which do not contain lithium are used as negative electrode active materials in the negative electrode.

Among the negative electrode active materials, especially, silicon-based negative electrode active materials have attracted great attention in that the capacity thereof is about 10 times higher than that of carbon-based negative electrode active materials and have an advantage in which even a thin electrode is capable of realizing high energy density due to their high capacity. However, the silicon-based negative electrode active materials have not been commonly used due to having a problem in which volumetric expansion occurs due to charging and discharging, active material particles are cracked/damaged by the volumetric expansion, and accordingly, lifetime characteristics are degraded.

In particular, in the case of the silicon-based active materials, the volumetric expansion/contraction that occurs due to charging and discharging leads to electrical disconnection between active materials, and thus lithium may not be smoothly intercalated/deintercalated into/from the silicon-based active materials, causing rapid degradation of the lifetime of the silicon-based active materials.

Therefore, there is a need to develop a secondary battery which has improved lifetime characteristics while realizing high capacity and high energy density of the silicon-based negative electrode active material.

Korean Unexamined Patent Publication No. 10-2017-0074030 relates to a negative electrode active material for a lithium secondary battery, a method of preparing the same, and a lithium secondary battery including the same and discloses a negative electrode active material including a porous silicon-carbon composite, but there is a limitation in solving the above-described problems.

PRIOR-ART DOCUMENTS

Patent Documents

Korean Unexamined Patent Publication No. 10-2017-0074030

DISCLOSURE

Technical Problem

The present invention is directed to providing a negative electrode which uses a silicon-based negative electrode active material and thus is capable of effectively preventing an electrical short circuit between active materials caused by charging and discharging.

The present invention is also directed to providing a secondary battery including the above-described negative electrode.

Technical Solution

One aspect of the present invention provides a negative electrode which includes: a negative electrode current collector; and a negative electrode active material layer on the negative electrode current collector, wherein the negative electrode active material layer includes a silicon-based negative electrode active material, a binder, a conductive material, and single-walled carbon nanotubes, and the single-walled carbon nanotubes are present in an amount of 0.001 wt % to 1 wt % in the negative electrode active material layer.

Another aspect of the present invention provides a secondary battery which includes: the above-described negative electrode; a positive electrode disposed to face the negative electrode; a separator interposed between the negative electrode and the positive electrode; and an electrolyte.

Advantageous Effects

A negative electrode according to the present invention includes a specific amount of single-walled carbon nanotubes in a negative electrode active material layer in use of a silicon-based negative electrode active material, and thus the single-walled carbon nanotubes can improve the electrical connection between the active materials even when the silicon-based negative electrode active material is volumetrically expanded due to charging and discharging, resulting in an improvement in lifetime characteristics of the negative electrode. Also, since the electrical connection between the active materials can be easily maintained by the single-walled carbon nanotubes, the negative electrode according to the present invention is preferred in terms of initial efficiency and a reduction in resistance.

DESCRIPTION OF DRAWINGS

FIG. 1 is a graph of evaluating initial efficiency according to examples and comparative examples.

FIG. 2 is a graph of evaluating the cycle capacity retention rate according to examples and comparative examples.

FIG. 3 is a graph of evaluating the resistance increase rate according to examples and comparative examples.

MODES OF THE INVENTION

Terms and words used in this specification and the claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprising", "including", and/or "having", when used herein, specify the presence of stated features, integers, steps, operations, elements, components and/or combinations thereof, but do not preclude the presence or addition of one or more other features, integers, steps, operations, elements, components and/or combinations thereof.

In the present invention, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. The laser diffraction method generally allows the measurement of a particle diameter ranging from a submicron level to several millimeters and may produce a result having high reproducibility and high resolution.

Hereinafter, the present invention will be described in detail.

<Negative Electrode>

The present invention provides a negative electrode, specifically, a negative electrode for a lithium secondary battery.

The negative electrode according to the present invention includes: a negative electrode current collector; and a negative electrode active material layer formed on the negative electrode current collector, wherein the negative electrode active material layer includes a silicon-based negative electrode active material, a binder, a conductive material, and single-walled carbon nanotubes, and the single-walled carbon nanotubes are included at 0.001 wt % to 1 wt % in the negative electrode active material layer.

In general, the silicon-based negative electrode active material is known to have a capacity about 10 times higher than that of a carbon-based negative electrode active material. Accordingly, when applied to the negative electrode, even a low thickness silicon-based negative electrode active material is expected to realize a thin film electrode having a high level of energy density. However, the silicon-based negative electrode active material has a problem of lifetime degradation caused by volumetric expansion/contraction that occurs as lithium is intercalated/deintercalated during charging and discharging. In particular, when the silicon-based negative electrode active material is volumetrically expanded/contracted due to charging and discharging, the electrical connection between the active materials is degraded, and the electrical short circuit occurs, causing rapid degradation of the lifetime of the negative electrode.

In order to solve the problem, the negative electrode according to the present invention includes single-walled carbon nanotubes (hereinafter, referred to as "SWCNTs") at 0.001 wt % to 1 wt % in the negative electrode active material layer in use of the silicon-based negative electrode active material. Due to the long fiber length of the SWCNTs, the electrical connection between the active materials may be maintained even when the silicon-based negative electrode active material is volumetrically expanded due to charging and discharging, and accordingly, an effective improvement in lifetime characteristics of the negative electrode, a reduction in resistance, and an improvement in initial efficiency may be achieved.

The negative electrode current collector is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may typically have a thickness of 3 to 100 μm, and preferably, 4 μm to 40 μm to realize a negative electrode with low thickness.

The negative electrode current collector may have fine irregularities formed on a surface thereof to increase the adhesion of the negative electrode active material. In addition, the negative electrode current collector may be used in any of various forms such as a film, a sheet, a foil, a net, a porous material, a foam, a non-woven fabric, and the like.

The negative electrode active material layer is formed on the negative electrode current collector.

The negative electrode active material layer includes a silicon-based negative electrode active material, a binder, a conductive material, and SWCNTs The silicon-based negative electrode active material may include a compound represented by $SiO_x$ ($0 \le x < 2$). Since $SiO_2$ does not react with lithium ions, it is not possible to store lithium. Therefore, it is preferable that x is within the above-described range.

Specifically, the silicon-based negative electrode active material may be Si. Conventionally, Si is advantageous in that the capacity thereof is about 2.5 to 3 times higher than that of silicon oxide (e.g., $SiO_x$ ($0 < x < 2$)), but has a problem in that the commercialization thereof is not easy due to the very high degree of volumetric expansion/contraction of Si caused by charging and discharging compared to that of silicon oxide. On the other hand, according to the present invention, since a specific amount of SWCNTs is included in the negative electrode active material layer, the electrical connection and conductive network between the active materials may be maintained even when Si is volumetrically expanded, and thus it is possible to effectively solve the problem of degradation of lifetime characteristics of the silicon-based negative electrode active material which is caused by the volumetric expansion, and more preferably, to realize high capacity and high energy density of the silicon-based negative electrode active material.

The silicon-based negative electrode active material may have an average particle diameter ($D_{50}$) of 0.5 μm to 10 μm, and preferably, 2 μm to 6 μm in view of ensuring the structural stability of the active material during charging and discharging, reducing side reactions by reducing a reaction area with an electrolyte solution, and reducing production costs. In particular, when the silicon-based negative electrode active material having an average particle diameter ($D_{50}$) within the above-described range is used with SWCNTs to be described, the electrical connection between the negative electrode active materials can be stably maintained.

The silicon-based negative electrode active material may be included at 50 wt % to 90 wt %, and preferably, 60 wt % to 80 wt % in the negative electrode active material layer in view of sufficiently realizing high capacity of the silicon-based negative electrode active material in a secondary battery.

The binder may include at least one selected from the group consisting of styrene butadiene rubber (SBR), acrylonitrile butadiene rubber, acrylic rubber, butyl rubber, fluoro rubber, polyvinyl alcohol, carboxymethylcellulose (CMC), starch, hydroxypropylcellulose, regenerated cellulose, polyvinyl alcohol (PVA), polyacrylic acid (PAA), polyethylene glycol (PEG), polyacrylonitrile (PAN), and polyacryl amide (PAM) in view of improving electrode adhesion and imparting sufficient resistance to the volumetric expansion/contraction of the silicon-based negative electrode active material.

The binder may include at least one selected from the group consisting of polyvinyl alcohol, polyacrylic acid, polyacrylonitrile, and polyacryl amide and preferably includes polyvinyl alcohol and polyacrylic acid in view of having high strength, excellent resistance to the volumetric expansion/contraction of the silicon-based negative electrode active material, and excellent flexibility so as to prevent the electrode from being warped, bent, and the like. When the binder includes polyvinyl alcohol and polyacrylic acid, the polyvinyl alcohol and polyacrylic acid may be included in a weight ratio of 50:50 to 90:10, and preferably, 55:45 to 80:20 in the binder in view of further enhancing the above-described effect.

The binder may be included at 5 wt % to 30 wt %, and preferably, 10 wt % to 25 wt % in the negative electrode active material layer. It is preferable that the content of the binder is within the above-described range in view of more effectively controlling the volumetric expansion of the active material.

The conductive material may be used to improve the conductivity of the negative electrode, and any conductive material that does not cause a chemical change and has conductivity is preferably used. Specifically, the conductive material may include at least one selected from the group consisting of natural graphite, artificial graphite, carbon black, acetylene black, Ketjen black, channel black, furnace black, lamp black, thermal black, conductive fiber, fluorocarbon, aluminum powder, nickel powder, zinc oxide, potassium titanate, titanium oxide, and a polyphenylene derivative and preferably includes carbon black in view of realizing high conductivity and excellent dispersibility.

The conductive material may have an average particle diameter ($D_{50}$) of 20 nm to 60 nm, and preferably, 25 nm to 55 nm. It is preferable that the average particle diameter of the conductive material is within the above-described range in view of facilitating the dispersion of the conductive material, improving the conductivity of the negative electrode, compensating for the low conductivity of the silicon-based negative electrode active material so as to improve battery capacity.

The conductive material may be included at 3 wt % to 20 wt %, and preferably, 5 wt % to 15 wt % in the negative electrode active material layer. When the content of the conductive material is within the above-described range, excellent conductivity can be exhibited, and the conductive material can supplement a conductive network formed by SWCNTs so as to improve the electrical connection between the active materials.

The SWCNTs are a type of carbon nanotube with a single cylindrical wall and have a fiber shape. The SWCNTs have a long fiber length due to breaking not occurring during the growth of tubes and also have a high degree of graphitization and high crystallinity, as compared to multi-walled carbon nanotubes (hereinafter, referred to as "MWCNTs").

Therefore, when included in the negative electrode active material layer, the SWCNTs effectively wrap the active materials due to their long fiber length and high crystallinity, and thus even when the active materials are volumetrically expanded, the electrical connection between the active materials may be stably maintained. Therefore, according to the negative electrode of the present invention, an electrical short circuit caused by the volumetric expansion of the active material and rapid degradation of the lifetime of the active material caused by the electrical short circuit may be effectively prevented, and the lifetime characteristics of the negative electrode may be improved. Also, the SWCNTs are preferred in view of reducing resistance and improving efficiency because they easily maintain the electrical connection between the active materials even though the volumetric expansion/contraction of the active material occurs.

The SWCNTs are included at 0.001 wt % to 1 wt % in the negative electrode active material layer. When the SWCNTs are included at less than 0.001 wt %, it is difficult to effectively wrap the active materials or maintain the electrical connection between the active materials. On the other hand, when the SWCNTs are included at more than 1 wt %, an excessive amount of SWCNTs leads to an increase in side reactions with an electrolyte solution, and since a usage amount of a dispersant used to disperse SWCNTs is increased, the viscosity and elasticity of a negative electrode slurry are excessively increased, resulting in degradation of processability in the production of the negative electrode.

The SWCNTs are preferably included at 0.1 wt % to 0.5 wt %, and more preferably, 0.2 wt % to 0.4 wt % in the negative electrode active material layer. Within the above-described range, the electrical connection between the active materials can be improved, side reactions with an electrolyte solution can be reduced, the resistance of the negative electrode can be reduced, and an amount of a dispersant used to disperse SWCNTs can be appropriately adjusted, and thus a negative electrode slurry can have a viscosity suitable for realizing a thin film negative electrode.

The SWCNTs may have an average length of 3 μm or more, preferably 4 μm or more, and more preferably 4.5 μm to 10 μm. It is preferable that the average length of the SWCNTs is within the above-described range in view of maintaining the conductive network between the active materials and preventing aggregation and a reduction in dispersibility which are caused by excessively lengthened SWCNTs.

In this specification, the average length of the SWCNTs is measured as follows. A solution (including a solid content of 1 wt % based on the total weight of the solution) obtained by adding SWCNTs and carboxymethylcellulose (CMC) in a weight ratio of 40:60 to water is diluted 1,000× in water. Afterward, 20 ml of the diluted solution is filtered through a filter, and the filter including the SWCNTs filtered thereon is dried. One hundred scanning electron microscope (SEM) images are taken of the dried filter, the length of the SWCNTs is measured using an ImageJ program, and an average value of the measured length is defined as the average length of the SWCNTs.

The SWCNTs may have an average diameter of 0.3 nm to 5 nm, and preferably, 0.5 nm to 3.5 nm. It is preferable that the average diameter of the SWCNTs is within the above-described range in view of reducing resistance and improving conductivity.

In this specification, the average diameter of the SWCNTs is measured as follows. A solution (including a solid content of 1 wt % based on the total weight of the solution) obtained by adding SWCNTs and carboxymethylcellulose (CMC) in a weight ratio of 40:60 to water is diluted 1,000× in water. One drop of the diluted solution is dropped on a transmission electron microscopy (TEM) grid, and the TEM grid is dried. The dried TEM grid is observed via TEM equipment (H-7650 manufactured by Hitachi High-Tech Corporation), and the average diameter of the SWCNTs is measured.

The ratio of the average length of the SWCNTs to the average diameter thereof may be 1,000:1 or more, and preferably, 1,000:1 to 5,000:1. It is preferable that the ratio is within the above-described range in view of improving the conductivity of the SWCNTs and maintaining the electrical connection even when the active materials are volumetrically expanded/contracted.

The SWCNTs may have a D/G value of 0.15 or less, preferably 0.09 or less, more preferably 0.005 to 0.05, and even more preferably 0.01 to 0.03, as represented by the following Equation 1, in a Raman spectrum.

$$D/G = D \text{ band peak intensity}/G \text{ band peak intensity} \qquad \text{[Equation 1]}$$

The D/G value may be used as an index that indicates the crystallinity of SWCNTs. For example, as the D/G value is lower (i.e., the G band peak intensity is higher), properties more similar to that of graphite are exhibited, and thus the SWCNTs may be determined to have higher crystallinity.

In the negative electrode according to the present invention, when the D/G value of the SWCNTs is adjusted within the above-described range, crystallinity and conductivity can be improved, and the charge transfer resistance of the negative electrode can be reduced. In particular, when the SWCNTs having the above-described D/G value and the silicon-based negative electrode active material (e.g., Si) are used together, a conductive network may be formed to allow smooth charge transfer between the silicon-based negative electrode active materials, the efficiency of the silicon-based negative electrode active material may be improved by excellent conductivity and resistance reduction, and the breaking of CNTs, decrease in fiber length, insufficient formation of a conductive network, and the like, which may occur when the SWCNTs have a high D/G value, may be prevented.

In the present invention, the silicon-based negative electrode active material and the SWCNTs may be included in a weight ratio of 50,000:1 to 90:1, preferably 5,000:1 to 150:1, and more preferably 450:1 to 200:1 in the negative electrode active material layer. Within the above-described range, the conductive network of SWCNTs can sufficiently wrap the negative electrode active material, an increase in side reactions with an electrolyte solution which is caused by an excessive amount of SWCNTs can be prevented, and a negative electrode slurry having desired levels of viscosity and solid content can be prepared by using the above-described content ratio, and thereby a thin film negative electrode is preferably realized.

In the present invention, the conductive material and the SWCNTs may be included in a weight ratio of 500:1 to 5:1, preferably, 300:1 to 10:1, and more preferably 40:1 to 20:1 in the negative electrode active material layer. Within the above-described range, the conductive material can supplement the conductive network formed by the SWCNTs so as to improve the electrical connection between the active materials, and the resistance reduction effect of the SWCNTs can be more preferably realized.

The negative electrode active material layer may further include a thickener. When included in the negative electrode active material layer, the thickener may improve the dispersibility of the components. Also, when included in a negative electrode slurry for preparing the negative electrode active material layer, the thickener may increase the dispersibility of the components and allow the negative electrode slurry to have a viscosity suitable for coating.

The thickener may be carboxymethylcellulose (CMC).

The thickener may be present in an amount of 0.1 to 1.5 wt %, and preferably, 0.3 to 0.5 wt % in the negative electrode active material layer.

According to the negative electrode active material layer, the above-described SWCNTs may increase the electrical connection of the silicon-based negative electrode active materials, and a thin film negative electrode with high energy density may be realized. Specifically, the negative electrode active material layer may have a thickness of 5 μm to 40 μm, and preferably, 15 μm to 30 μm.

The negative electrode may be produced by dispersing the silicon-based negative electrode active material, the binder, the conductive material, the SWCNTs, and optionally, the thickener in a solvent for forming a negative electrode slurry to prepare a negative electrode slurry and applying the negative electrode slurry onto the negative electrode current collector, followed by drying and roll pressing.

Specifically, the negative electrode slurry may be prepared by preparing a conductive material solution in which SWCNTs and a thickener are added to a solvent (e.g., distilled water) and adding the silicon-based negative electrode active material, the binder, the conductive material, and the conductive material solution to a solvent for forming a negative electrode slurry. Since the negative electrode slurry is prepared after the preparation of the conductive material solution in which the SWCNTs and the thickener are pre-dispersed, the dispersibility of the SWCNTs may be improved.

The conductive material solution may include the SWCNTs and the thickener in a weight ratio of 20:80 to 50:50, and preferably, 35:65 to 45:55. In this case, the SWCNTs may be smoothly dispersed.

The solvent for forming a negative electrode slurry may include at least one selected from the group consisting of distilled water, ethanol, methanol, and isopropyl alcohol and preferably includes distilled water in view of facilitating the dispersion of the components.

<Secondary Battery>

The present invention provides a secondary battery, specifically, a lithium secondary battery, including the above-described negative electrode.

Specifically, the secondary battery according to the present invention includes: the above-described negative electrode; a positive electrode disposed to face the negative electrode; a separator interposed between the negative electrode and the positive electrode; and an electrolyte.

The positive electrode may include a positive electrode current collector and a positive electrode active material layer formed on the positive electrode current collector.

The positive electrode current collector is not particularly limited as long as it does not cause a chemical change in the battery and has high conductivity. Specifically, as the positive electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The positive electrode current collector may typically have a thickness of 3 to 500 μm.

The positive electrode current collector may have fine irregularities formed on a surface thereof to increase the adhesion of a positive electrode active material. In addition, the positive electrode current collector may be used in any of various forms such as a film, a sheet, a foil, a net, a porous material, a foam, a non-woven fabric, and the like.

The positive electrode active material layer may include a positive electrode active material.

The positive electrode active material may include a compound that enables the reversible intercalation and deintercalation of lithium, specifically, a lithium-transition metal composite oxide including lithium and at least one transition metal selected from the group consisting of nickel, cobalt, manganese, and aluminum, and preferably, a lithium-transition metal composite oxide including lithium and transition metals including nickel, cobalt, and manganese.

More specifically, the lithium-transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}MnyO_2$ (where 0<Y<1), $LiMn_{2-z}Ni_zO_4$ (where 0<Z<2), etc.), a lithium-nickel-cobalt-based oxide (e.g., $LiNi_{1-Y1}Co_{Y1}O_2$ (where 0<Y1<1), etc.), a lithium-manganese-cobalt-based oxide (e.g., $LiCo_{1-Y2}Mny_2O_2$ (where 0<Y2<1), $LiMn_{2-z1}Co_{z1}O_4$ (where 0<Z1<2), etc.), a lithium-nickel-manganese-cobalt-based oxide (e.g., $Li(Ni_pCo_qMn_{r1})O_2$ (where 0<p<1, 0<q<1, 0<r1<1, p+q+r1=1), $Li(Ni_{p1}Co_{q1}Mn_{r2})O_4$ (where 0<p1<2, 0<q1<2, 0<r2<2, p1+q1+r2=2), etc.), or a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg, and Mo, and p2, q2, r3, and s2 are respective atomic fractions of elements which are independent of one another, and 0<p2<1, 0<q2<1, 0<r3<1, 0<s2<1, p2+q2+r3+s2=1), etc.), which may be used alone or in combination of two or more thereof. Among those listed above, in view of increasing the capacity characteristic and stability of the battery, the lithium-transition metal composite oxide may be $LiCoO_2$, $LiMnO_2$, $LiNiO_2$, a lithium-nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.). In addition, considering that the types and content ratio of elements constituting the lithium-transition metal composite oxide are controlled to realize a remarkable improvement effect, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, which may be used alone or in combination of two or more thereof.

The positive electrode active material may be present in an amount of 80 wt % to 99 wt %, and preferably, 92 wt % to 98.5 wt % in the positive electrode active material layer in consideration of sufficiently exhibiting the capacity of the positive electrode active material.

The positive electrode active material layer may further include a binder and/or a conductive material in addition to the above-described positive electrode active material.

The binder serves to assist bonding between an active material and a conductive material and bonding to a current collector. Specifically, the binder may include at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, styrene butadiene rubber, and fluorine rubber and preferably includes polyvinylidene fluoride.

The binder may be present in an amount of 1 wt % to 20 wt %, and preferably, 1.2 wt % to 10 wt % in the positive electrode active material layer in view of sufficiently ensuring bonding between components such as the positive electrode active material.

The conductive material may be used to impart conductivity to a secondary battery and improve the conductivity and is not particularly limited as long as it does not cause a chemical change and has conductivity. Specifically, the conductive material may include at least one selected from the group consisting of graphite such as natural graphite, artificial graphite, or the like; carbon black such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon; a metal powder such as aluminum powder, nickel powder, or the like; a conductive whisker consisting of zinc oxide, potassium titanate, or the like; a conductive metal oxide such as titanium oxide or the like; and a polyphenylene derivative and preferably includes carbon black in view of improving conductivity.

The conductive material may be present in an amount of 1 wt % to 20 wt %, and preferably, 1.2 wt % to 10 wt % in the positive electrode active material layer in view of sufficiently ensuring electrical conductivity.

The positive electrode active material layer may have a thickness of 30 μm to 400 μm, and preferably, 50 μm to 110 μm.

The positive electrode may be produced by applying a positive electrode slurry including a positive electrode active material, and optionally, the binder, the conductive material, and a solvent for forming a positive electrode slurry onto the positive electrode current collector, followed by drying and roll pressing.

The solvent for forming a positive electrode slurry may include an organic solvent such as N-methyl-2-pyrrolidone (NMP) or the like and may be used in an amount suitable for achieving preferable viscosity when the positive electrode active material, and optionally, the binder and the conductive material are included. For example, the solvent for forming a positive electrode slurry may be included in the positive electrode slurry so that the amount of a solid content including the positive electrode active material, and optionally, the binder and the conductive material ranges from 50 wt % to 95 wt %, and preferably, 70 wt % to 90 wt %.

The separator serves to separate the negative electrode and the positive electrode and provide a passage for lithium ion migration, and any separator used as a separator in a typical lithium secondary battery may be used without limitation. In particular, a separator that exhibits low resistance to the migration of ions of an electrolyte and has an excellent electrolyte impregnation ability is preferred. Specifically, as the separator, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof may be used. In addition, as the separator, a common porous non-woven fabric, for example, a non-woven fabric made of high-melting-point glass fiber, polyethylene terephthalate fiber, or the like may be used. Additionally, in order to ensure heat resistance or mechanical strength, a coated separator which includes a ceramic component or polymer material and optionally has a single-layer or multi-layer structure may be used as the separator.

Examples of the electrolyte used in the present invention include an organic liquid electrolyte, an inorganic liquid electrolyte, a solid polymer electrolyte, a gel-type polymer electrolyte, an inorganic solid electrolyte, a molten-type inorganic electrolyte, and the like that are usable in the production of a secondary battery, but the present invention is not limited thereto.

Specifically, the electrolyte may include an organic solvent and a lithium salt.

As the organic solvent, any organic solvent may be used without particular limitation as long as it may serve as a medium through which ions involved in an electrochemical reaction of the battery can migrate. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded, an aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte solution performance may be exhibited.

As the lithium salt, any compound may be used without particular limitation as long as it may provide lithium ions used in the lithium secondary battery.

Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

The secondary battery may be produced by a conventional method of producing a secondary battery, that is, by interposing a separator between the above-described negative electrode and positive electrode and injecting an electrolyte solution.

The secondary battery according to the present invention is useful in the field of portable devices such as mobile phones, notebook computers, digital cameras, and the like and electric vehicles such as hybrid electric vehicles (HEVs) and the like and is preferably used, particularly, as a battery constituting a medium-to-large-sized battery module. Therefore, the present invention also provides a medium-to-large-sized battery module including the above-described secondary battery as a unit cell.

Such a medium-to-large-sized battery module is preferably applied as a power source of a device that requires high output and high capacity, such as electric vehicles, hybrid electric vehicles, a system for storing electric power, and the like.

Hereinafter, the present invention will be described in detail with reference to Examples so that those skilled in the art can easily carry out the present invention. However, the present invention may be embodied in several different forms, and therefore, is not limited to Examples described herein.

EXAMPLES

Example 1: Production of Negative Electrode

A conductive material solution was prepared by dispersing SWCNTs and carboxymethylcellulose (CMC, weight-average molecular weight ($M_w$): 150,000) as a thickener in a weight ratio of 40:60 in water.

A silicon-based negative electrode active material (Si, average particle diameter ($D_{50}$): 3 μm) as a negative electrode active material, carbon black (average particle diameter ($D_{50}$): 35 nm, Super C65 manufactured by Imerys) as a conductive material, a binder, and the conductive material solution containing SWCNTs and CMC were added to a solvent for forming a negative electrode slurry (distilled water) to prepare a negative electrode slurry (including a solid content of 30 wt % based on the total weight of the negative electrode slurry). In this case, the negative electrode active material, the conductive material, the binder, the SWCNTs, and the CMC were mixed in a weight ratio of 70:7:22.25:0.30:0.45 in the negative electrode slurry.

As the binder, a polyvinyl alcohol (PVA)/Na-substituted polyacrylic acid (PAA) copolymer (hereinafter, referred to as "PVA/PAA", Aquacharge manufactured by SUMITOMO SEIKA) was used.

The SWCNTs had an average length of 5 μm, an average diameter of 1.5 nm, and a D/G value of 0.02 as measured by Raman spectroscopy.

The negative electrode slurry was applied in a loading amount of 68 mg/cm$^2$ (7.4 mAh/cm$^2$) onto one surface of a copper current collector (thickness: 15 μm) as a negative electrode current collector, roll-pressed, and dried in a 130 °C vacuum oven for 10 hours to form a negative electrode active material layer (thickness: 21.5 μm), and the resultant was used as a negative electrode (thickness: 36.5 μm) according to Example 1.

Examples 2 to 4 and Comparative Examples 1 to 4

Negative electrodes according to Examples 2 to 4 and Comparative Examples 1 to 4 were produced in the same manner as in Example 1 except that types and contents of a negative electrode active material, CNTs, a conductive material, a binder, and a dispersant were used as shown in the following Table 1.

TABLE 1

| | Negative electrode active material | | | CNT | | | | | Conductive material (carbon black) | | Binder | | Thickener (CMC) |
|---|---|---|---|---|---|---|---|---|---|---|---|---|---|
| | Type | Average particle diameter ($D_{50}$) (μm) | wt % | Type | Average length (μm) | Average diameter (nm) | wt % | D/G value | Type | wt % | Type | wt % | wt % |
| Example 1 | Si | 3 | 70 | SWCNT | 5 | 1.5 | 0.3 | 0.02 | Carbon black | 7 | PVA/PAA | 22.25 | 0.45 |
| Example 2 | Si | 3 | 70 | SWCNT | 5 | 1.5 | 0.15 | 0.02 | Carbon black | 7 | PVA/PAA | 22.625 | 0.225 |
| Example 3 | Si | 3 | 70 | SWCNT | 5 | 1.5 | 0.45 | 0.02 | Carbon black | 7 | PVA/PAA | 21.875 | 0.675 |
| Example 4 | Si | 3 | 70 | SWCNT | 5 | 1.5 | 0.3 | 0.12 | Carbon black | 7 | PVA/PAA | 22.25 | 0.45 |
| Comparative Example 1 | Si | 3 | 70 | — | — | — | — | — | Carbon black | 10 | PVA/PAA | 20 | — |
| Comparative Example 2 | Si | 3 | 70 | MWCNT | 1 | 12 | 3 | 1.09 | Carbon black | 7 | PVA/PAA | 19.4 | 0.6 |
| Comparative Example 3 | Si | 3 | 70 | SWCNT | 5 | 1.5 | 0.0005 | 0.02 | Carbon black | 7 | PVA/PAA | 22.99875 | 0.00075 |
| Comparative Example 4 | Si | 3 | 70 | SWCNT | 5 | 1.5 | 1.5 | 0.02 | Carbon black | 7 | PVA/PAA | 19.25 | 2.25 |

In Table 1, the average length and average diameter of the SWCNTs were measured by the following methods.

1) Average Length

Each of the conductive material solutions prepared in Examples 1 to 4 and Comparative Examples 2 to 4 was diluted 1,000× in water. Afterward, 20 ml of the diluted solution was filtered through a filter, and the filter including the SWCNTs filtered thereon was dried. One hundred scanning electron microscope (SEM) images were taken of the dried filter, the length of the SWCNTs was measured using an ImageJ program, and an average value of the measured length was defined as the average length of the SWCNTs.

2) Average Diameter

Each of the conductive material solutions prepared in Examples 1 to 4 and Comparative Examples 2 to 4 was diluted 1,000× in water. One drop of the diluted solution was dropped on a TEM grid, and the TEM grid was dried. The dried TEM grid was observed via TEM equipment (H-7650 manufactured by Hitachi High-Tech Corporation), and the average diameter of the CNTs was measured.

3) D/G Value

The D/G value of the CNTs used in Examples 1 to 4 and Comparative Examples 2 to 4 was measured using a Raman spectrometer (FEX manufactured by NOST).

EXPERIMENTAL EXAMPLES

Experimental Example 1: Evaluation of Initial Capacity and Efficiency

<Production of Secondary Battery>

As a positive electrode, lithium metal was used.

A polyethylene separator was interposed between each of the negative electrodes produced in Examples 1 to 4 and Comparative Examples 1 to 4 and the positive electrode, and an electrolyte was injected to produce a coin-type half-cell secondary battery. The electrolyte was prepared by adding vinylene carbonate at 3 wt % with respect to the total weight of the electrolyte to an organic solvent in which fluoroethylene carbonate (FEC) and dimethyl carbonate (DMC) were mixed in a volume ratio of 30:70 and adding $LiPF_6$ as a lithium salt at a concentration of 1 M.

<Evaluation of Initial Charge Capacity, Initial Discharge Capacity, and Initial Efficiency>

The initial charge capacity, initial discharge capacity, and initial efficiency (initial discharge capacity/initial charge capacity) of the secondary batteries according to Examples 1 to 4 and Comparative Examples 1 to 4 were evaluated using an electrochemical charging/discharging device.

The initial charge capacity, initial discharge capacity, and initial efficiency were measured by charging and discharging the secondary batteries according to Examples 1 to 4 and Comparative Examples 1 to 4 under the following charging and discharging conditions. Results thereof are shown in FIG. 1 and Table 2.

Charging conditions: 0.1 C, CC/CV (1.5V, 0.05 C cut-off)

Discharging conditions: 0.1 C, CC (0.05V cut-off)

TABLE 2

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Initial discharge capacity (mAh/g) | 3,948 | 3,831 | 3,855 | 3,739 | 3,572 | 3,660 | 3,370 | 3,554 |
| Initial charge capacity (mAh/g) | 4,143 | 4,145 | 4,162 | 3,999 | 4,054 | 4,067 | 3,732 | 3,931 |

TABLE 2-continued

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Initial efficiency (%) | 95.29 | 92.42 | 92.62 | 93.50 | 88.11 | 89.99 | 90.30 | 90.40 |

Referring to FIG. 1 and Table 2, it can be seen that the secondary batteries using the negative electrodes according to Examples 1 to 4 are remarkably excellent in initial discharge capacity, initial charge capacity, and initial efficiency compared to the secondary batteries according to Comparative Examples 1 to 4.

Experimental Example 2: Evaluation of Lifetime Characteristics

<Production of Secondary Battery>

A mixture of $LiNi_{0.8}Co_{0.1}Mn_{0.1}O_2$ and $LiNiO_2$ in a weight ratio of 96:4 as a positive electrode active material, carbon black as a conductive material, and PVdF as a binder were added in a weight ratio of 97:1.5:1.5 to an N-methyl-2-pyrrolidone (NMP) solvent to prepare a positive electrode slurry. The positive electrode slurry was applied in a loading amount of 458 mg/cm$^2$ (3.7 mAh/cm$^2$) onto one surface of an aluminum current collector (thickness: 12 μm) as a positive electrode current collector, roll pressed, and dried in a 130 °C vacuum oven for 10 hours to form a positive electrode active material layer (thickness: 20.1 μm), and the resultant was used as a positive electrode (thickness: 32.1 μm).

A polyethylene separator was interposed between each of the negative electrodes produced in Examples 1 to 4 and Comparative Examples 1 to 4 and the positive electrode, and an electrolyte was injected to produce a coin-type full-cell secondary battery. The electrolyte was prepared by adding vinylene carbonate at 3 wt % with respect to the total weight of the electrolyte to an organic solvent in which FEC and DMC were mixed in a volume ratio of 30:70 and adding $LiPF_6$ as a lithium salt at a concentration of 1 M.

<Evaluation of Capacity Retention Rate>

The cycle capacity retention rate of the secondary batteries according to Examples 1 to 4 and Comparative Examples 1 to 4 was evaluated using an electrochemical charging/discharging device.

The cycle capacity retention rate were measured by charging and discharging the secondary batteries under conditions of charging/discharging 0.5 C/0.5 C, 4.2V to 2.5V, 0.05 C completion and calculated by the following Equation 2. Results thereof are shown in FIG. 2, and the 100-cycle capacity retention rates are shown in Table 3.

$$\text{Cycle capacity retention rate (\%)} = \{(\text{Discharge capacity at } N^{th} \text{ cycle}) / (\text{Discharge capacity at } 1^{st} \text{ cycle})\} \times 100 \qquad \text{[Equation 2]}$$

(In Equation 2, N is an integer of 1 to 100)

TABLE 3

| | Example 1 | Example 2 | Example 3 | Example 4 | Comparative Example 1 | Comparative Example 2 | Comparative Example 3 | Comparative Example 4 |
|---|---|---|---|---|---|---|---|---|
| 100-cycle capacity retention rate (%) | 88.72 | 85.25 | 84.09 | 80.89 | 57.89 | 63.87 | 54.76 | 75.61 |

Referring to FIG. 2 and Table 3, it can be seen that the secondary batteries using the negative electrodes according to Examples 1 to 4 exhibit significantly improved lifetime characteristics compared to the secondary batteries according to Comparative Examples 1 to 4.

Experimental Example 3: Evaluation of Resistance Increase Rate

<Production of Secondary Battery>

A mixture of $LiNi_{0.8}Co_{0.1}Mn_{0.1}O_2$ and $LiNiO_2$ in a weight ratio of 96:4 as a positive electrode active material, carbon black as a conductive material, and PVdF as a binder were added in a weight ratio of 97:1.5:1.5 to an NMP solvent to prepare a positive electrode slurry. The positive electrode slurry was applied in a loading amount of 458 mg/cm$^2$ (3.7 mAh/cm$^2$) onto one surface of an aluminum current collector (thickness: 12 μm) as a positive electrode current collector, roll pressed, and dried in a 130 °C vacuum oven for 10 hours to form a positive electrode active material layer (thickness: 20.1 μm), and the resultant was used as a positive electrode (thickness: 32.1 μm).

A polyethylene separator was interposed between each of the negative electrodes produced in Examples 1 to 4 and Comparative Examples 1 to 4 and the positive electrode, and an electrolyte was injected to produce a pouch-type full-cell secondary battery. The electrolyte was prepared by adding vinylene carbonate at 3 wt % with respect to the total weight of the electrolyte to an organic solvent in which FEC and DMC were mixed in a volume ratio of 30:70 and adding $LiPF_6$ as a lithium salt at a concentration of 1 M.

<Evaluation of Resistance Increase Rate>

The resistance increase rate of the secondary batteries according to Examples 1 to 4 and Comparative Examples 1 to 4 was evaluated using an electrochemical charging/discharging device.

The resistance increase rate were measured by charging and discharging the secondary batteries under conditions of charging/discharging 0.5 C/0.5 C, 4.2V to 2.5V, 0.05 C completion for 100 cycles while a HPPC test (C-rate: 3 C) was performed at 50% SOC every 20 cycles. The resistance increase rate was calculated by the following Equation 3, and results thereof are shown in FIG. 3. Also, the 100-cycle resistance increase rates are shown in Table 4.

$$\text{Cycle resistance increase rate (\%)} = \{(\text{Resistance at } N^{th} \text{ cycle})/(\text{Resistance at } 1^{st} \text{ cycle})\} \times 100 \qquad \text{[Equation 3]}$$

(In Equation 3, N is an integer of 1 to 100)

TABLE 4

| | Example 1 | Example 2 | Example 3 | Example 4 | Comparative Example 1 | Comparative Example 2 | Comparative Example 3 | Comparative Example 4 |
|---|---|---|---|---|---|---|---|---|
| 100-cycle resistance increase rate (%) | 49 | 59 | 53 | 51 | 157 | 79 | 168 | 69 |

Referring to FIG. 3 and Table 4, it can be seen that the secondary batteries using the negative electrodes according to Examples 1 to 4 exhibit an excellent resistance reduction effect compared to the secondary batteries according to Comparative Examples 1 to 4.

The invention claimed is:

1. A negative electrode comprising:

a negative electrode current collector; and a negative electrode active material layer on the negative electrode current collector, wherein the negative electrode active material layer comprises a silicon-based negative electrode active material, a binder, a conductive material, and single-walled carbon nanotubes, wherein the conductive material comprises carbon black, wherein the silicon-based negative electrode active material is present in an amount of 60 wt % to 80 wt % in the negative electrode active material layer, wherein the single-walled carbon nanotubes are present in an amount of 0.001 wt % to 0.5 wt % in the negative electrode active material layer, wherein the silicon-based negative electrode active material and the single-walled carbon nanotubes are present in a weight ratio of 5,000:1 to 150:1 in the negative electrode active material layer, and wherein the conductive material and the single-walled carbon nanotubes are present in a weight ratio of 500:1 to 5:1 in the negative electrode active material layer.

2. The negative electrode of claim 1, wherein the single-walled carbon nanotubes have a D/G value of 0.15 or less, as represented by the following Equation 1, in a Raman spectrum, $$D/G = D \text{ band peak intensity}/G \text{ band peak intensity} \qquad \text{[Equation 1]}.$$

3. The negative electrode of claim 1, wherein the single-walled carbon nanotubes have an average length of 3 μm or more.

4. The negative electrode of claim 1, wherein the silicon-based negative electrode active material is Si.

5. The negative electrode of claim 1, wherein the silicon-based negative electrode active material has an average particle diameter ($D_{50}$) of 0.5 μm to 10 μm.

6. The negative electrode of claim 1, wherein the negative electrode active material layer has a thickness of 5 μm to 40 μm.

7. A secondary battery comprising:

the negative electrode of claim 1;

a positive electrode disposed to face the negative electrode;

a separator interposed between the negative electrode and the positive electrode; and an electrolyte.

8. The negative electrode of claim 1, wherein the single-walled carbon nanotubes are present in an amount of 0.15 wt % to 0.5 wt % in the negative electrode active material layer.

9. The negative electrode of claim 1, wherein the single-walled carbon nanotubes are present in an amount of 0.15 wt % to 0.45 wt % in the negative electrode active material layer.

10. The negative electrode of claim 1, wherein the conductive material and the single-walled carbon nanotubes are present in a weight ratio of 40:1 to 10:1 in the negative electrode active material layer.

11. A negative electrode comprising:

a negative electrode current collector; and a negative electrode active material layer on the negative electrode current collector, wherein the negative electrode active material layer comprises a silicon-based negative electrode active material, a binder, a conductive material, and single-walled carbon nanotubes, wherein the conductive material comprises carbon black, wherein the single-walled carbon nanotubes are present in an amount of 0.001 wt % to 0.5 wt % in the negative electrode active material layer, wherein the silicon-based negative electrode active material and the single-walled carbon nanotubes are present in a weight ratio of 5,000:1 to 150:1 in the negative electrode active material layer, and wherein the conductive material and the single-walled carbon nanotubes are present in a weight ratio of 500:1 to 5:1 in the negative electrode active material layer.

* * * * *